2 Sheets--Sheet 1.

A. F. BATCHELLER.
Corn-Plows.

No. 156,268. Patented Oct. 27, 1874.

WITNESSES

INVENTOR
Alexander F. Batcheller
Chipman Hosmer & Co.
Attorneys

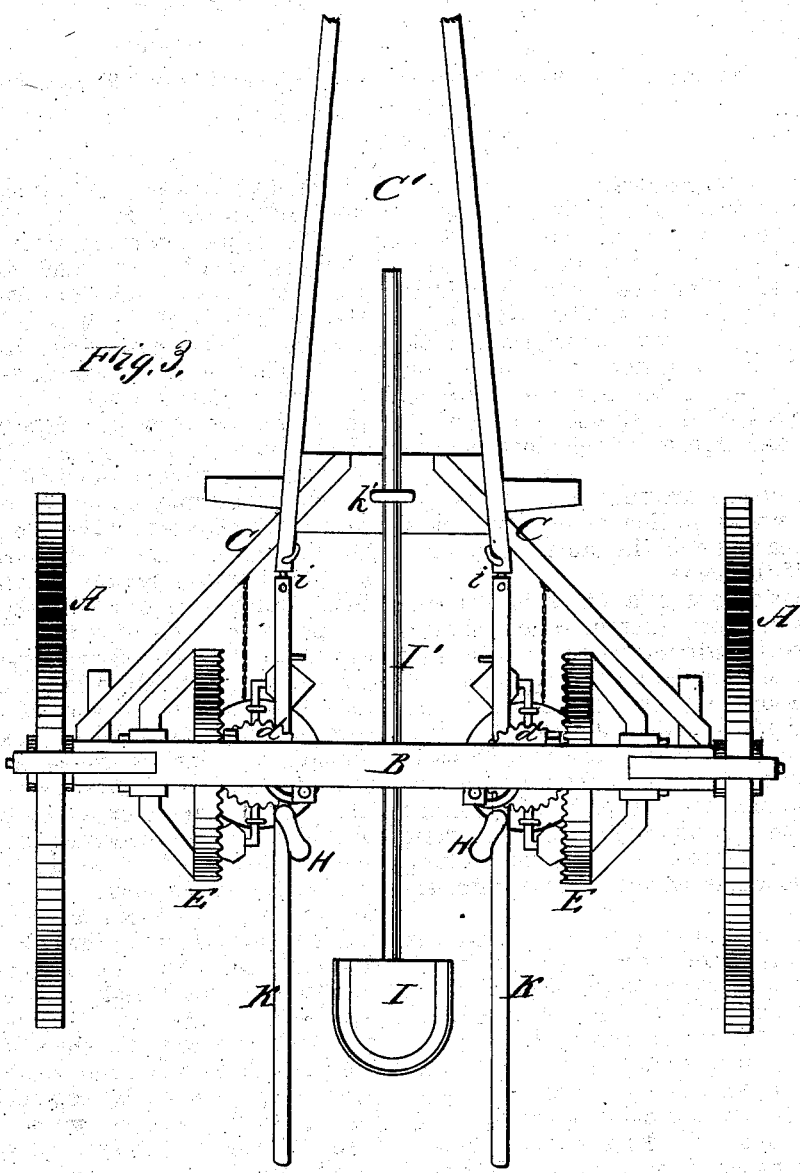

UNITED STATES PATENT OFFICE.

ALEXANDER F. BATCHELLER, OF FINCHFORD, IOWA.

IMPROVEMENT IN CORN-PLOWS.

Specification forming part of Letters Patent No. 156,268, dated October 27, 1874; application filed July 18, 1874.

*To all whom it may concern:*

Be it known that I, ALEXANDER F. BATCHELLER, of Finchford, in the county of Black Hawk and State of Iowa, have invented a new and valuable Improvement in Corn-Plow; and I do hereby declare that the following is a full, clear, and exact description of the construction and operation of the same, reference being had to the annexed drawings making a part of this specification, and to the letters and figures of reference marked thereon.

Figure 1:
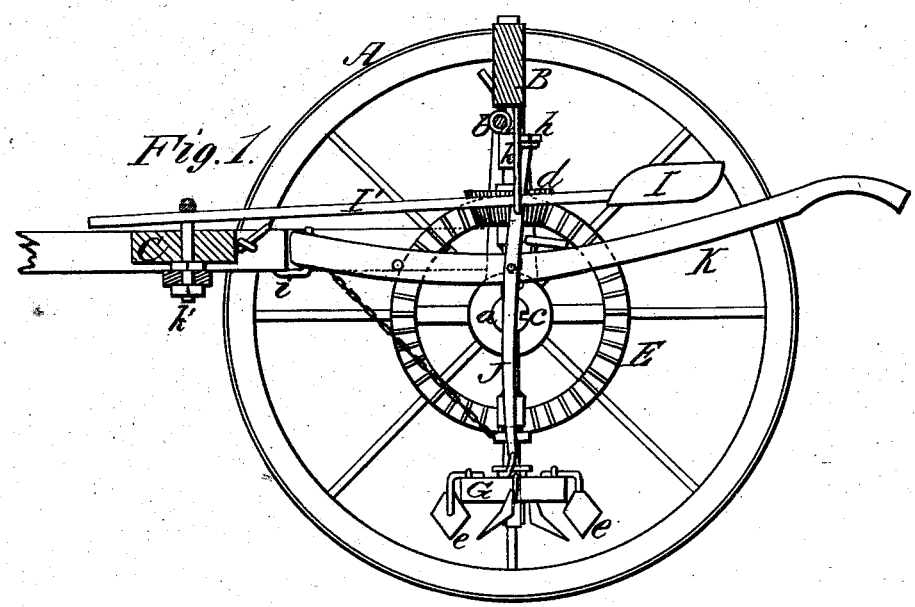
Figure 2:
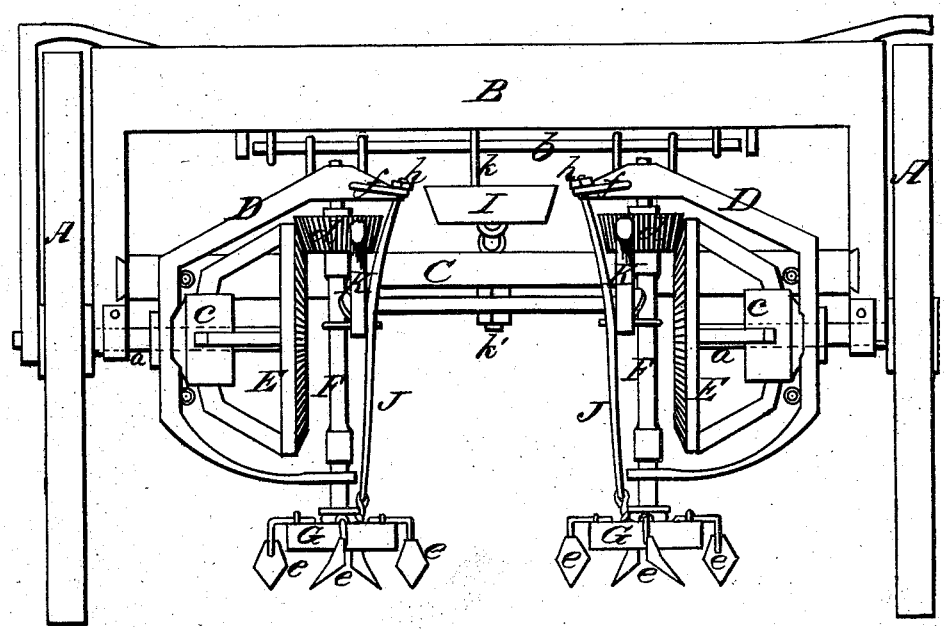

Figure 1 of the drawing is a representation of a vertical section of my corn-plow. Fig. 2 is a rear view of the same. Fig. 3 is a plan view of the same.

This invention has relation to implements for cultivating corn, wherein rotary shovels are employed for stirring the soil. It consists mainly in a novel mode of hanging the shovel-heads whereby they can be raised or depressed and adjusted laterally, whether they be in motion or at rest. It also consists in a novel mode of applying handles to the shafts of the shovel-carrying heads whereby the vertical and lateral adjustments of these heads can be effected by a person walking behind the machine, as will be hereinafter explained.

In the annexed drawings, A A designate two transporting and driving wheels, which are secured on short rotating axles $a\ a$, which have their bearings in the lower ends of an arched frame, B, to the front side of which the hounds C and draft-pole C' are rigidly secured. D D are sliding yokes, the upper ends of which are attached by staples to a guide-rod, $b$, under the horizontal portion of frame B. Portions of these yokes D D loosely embrace annular grooves in the hubs $c\ c$ of dished cog-wheels E E, which hubs are applied on the axles $a\ a$ by means of feathers and grooves. The wheels E E and yokes D D are allowed to receive lateral adjustment, at the same time wheels E E may be rotating. F F designate vertical shafts, which have their bearings in the upper and lower ends of the laterally-adjustable yokes D D, and which have keyed to their upper ends pinion spur-wheels $d\ d$ that engage with the teeth of wheels E E. The shafts F F thus receive rapid rotary motion when the machine is moved along, and these shafts are movable toward and from each other with their yokes D D, by means hereinafter explained. G G designate circular heads, which are applied on the lower ends of the shafts F F by means of feathers and grooves, so that they are vertically adjustable on these shafts but turn with them. To these heads shovels $e$ are secured in any suitable manner, which shovels may be of any required shape found best adapted to the purpose intended. On the upper sides of the heads G G hubs $g\ g$ are formed, having annular grooves in them, which receive collars that are secured to the lower ends of rods J J. These rods extend upward and their screw-threaded upper ends pass loosely through loops $f\ f$, fixed into the upper ends of yokes D D, and on the threaded portions of these rods nuts $h\ h$ are applied, by adjusting which the heads G G can be raised or depressed on their shafts. The rods J J are secured by pivots to handles K K, which are jointed, at $i\ i$, to the front ends of the hounds C, so that these handles can be moved vertically as well as laterally, for the purpose of raising or depressing the shovels and adjusting them laterally. H H designate foot-rests for a person sitting in the seat I, which rests are secured on the handles K. The seat I is applied on the rear end of a rod, I', which is attached to the frame B by a pendant, $k$, and to the front ends of the hounds by an eyebolt, $k'$, by adjusting which the seat can be raised or lowered. The rod I' allows the seat to be adjusted forward or backward.

What I claim as new, and desire to secure by Letters Patent, is—

1. The heads G G, vertically adjustable on the shafts F F, in combination with rods J J and nuts $h\ h$, and yokes D D, as and for the purposes described.

2. Rods J, connected to handles K and combined with vertically-adjustable heads G and laterally-adjustable yokes D, as and for the purposes described.

3. Supporting-bar $b$, in combination with yokes D and shovel-carrying heads G, substantially as described.

4. The seat I, on rod I', in combination with pendant $k$ and eyebolt $k'$, substantially as described.

In testimony that I claim the above I have hereunto subscribed my name in the presence of two witnesses.

ALEXANDER FRELAND BATCHELLER.

Witnesses:
 J. L. WHITNEY,
 O. B RICE.